(12) United States Patent
Baker

(10) Patent No.: US 7,292,003 B1
(45) Date of Patent: Nov. 6, 2007

(54) STARTER/GENERATOR WITH PERMANENT MAGNET GENERATOR POSITION INDICATOR

(75) Inventor: Donal E. Baker, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 11/502,067

(22) Filed: Aug. 10, 2006

(51) Int. Cl.
*H02P 1/46* (2006.01)

(52) U.S. Cl. .................. 318/717; 318/714; 318/715; 318/254; 322/20

(58) Field of Classification Search ............ 318/717, 318/254, 714, 715
See application file for complete search history.

(56) References Cited

U.S. PATENT DOCUMENTS

| | | | | |
|---|---|---|---|---|
| 3,937,974 A | * | 2/1976 | Lafuze ..................... 290/46 |
| 5,717,305 A | * | 2/1998 | Seibel et al. ............... 318/778 |
| 6,737,833 B2 | * | 5/2004 | Kalman et al. ............. 322/20 |
| 7,084,591 B2 | * | 8/2006 | Kobayashi et al. ........ 318/254 |
| 7,170,256 B2 | * | 1/2007 | Iwashita et al. ........... 318/717 |
| 2003/0034751 A1 | * | 2/2003 | Walters ..................... 318/445 |
| 2004/0007995 A1 | * | 1/2004 | Fu ............................ 318/254 |
| 2004/0207358 A1 | * | 10/2004 | Tobari et al. .............. 318/717 |
| 2005/0007044 A1 | * | 1/2005 | Qiu et al. .................. 318/254 |
| 2006/0006748 A1 | * | 1/2006 | Nilson ...................... 310/68 B |
| 2006/0043923 A1 | * | 3/2006 | Baker et al. ............... 318/807 |

* cited by examiner

*Primary Examiner*—Lincoln Donovan
*Assistant Examiner*—Antony Paul
(74) *Attorney, Agent, or Firm*—Stephen G. Mican

(57) ABSTRACT

A motor control system for a wound field synchronous dynamoelectric machine used as an electrical starter and a generator for aeronautical engines that uses its integral auxiliary permanent magnet generator as an angular position sensor in its starting mode.

16 Claims, 2 Drawing Sheets

STARTER/GENERATOR WITH PERMANENT MAGNET GENERATOR POSITION INDICATOR

FIELD OF THE INVENTION

The invention relates to control of a wound field synchronous dynamoelectric machine (WFSDM), and more particularly to rotor position sensing for a WFSDM that serves as both a motor and a generator using its integral auxiliary permanent magnet generator (PMG) as a position sensor for an associated motor drive system for the WFSDM.

BACKGROUND OF THE INVENTION

It is possible to use a single WFSDM for an aeronautical gas turbine engine to serve as both a source of motive power to start the engine and as a source of electrical power driven by the engine. Provided that aeronautical electrical loads that the WFSDM supply as a generator approach the power rating of the WFSDM as a starter motor for the engine, this approach is desirable from the standpoint of weight, cost and reliability.

However, operation of a WFSDM as a starter motor generally requires accurate determination of the position of its rotor to control rotor flux and torque during the starting mode. Most commonly, a rotor position sensor for the WFSDM serves this purpose. Such a position sensor usually comprises an electromechanical shaft position resolver that couples onto the drive shaft of the WFSDM. The resolver may provide relatively accurate absolute angular position information of the drive shaft with suitable exciter electrical excitation and resolver output signal processing. The addition of such a resolver with its associated wiring adds undesirable cost, complexity and unreliability to the system. Various "sensorless" control strategies that eliminate the need for a resolver are available but most are marginal in performance and not inherently robust.

SUMMARY OF THE INVENTION

The invention comprises a motor control system for a WFSDM used as an electrical starter and generator for aeronautical engines that uses its integral auxiliary PMG as an angular position sensor in its starting mode. The integral auxiliary PMG is desirable for a WFSDM of the aeronautical type used for generating power to satisfy stringent overall aircraft reliability and controllability requirements as well as the requirement to be autonomous from other electrical power sources. In the starting mode, an external power source provides power for operation and the PMG is not required for any starting mode functions. It is, therefore, available for use in the starting mode as a completely independent and uncorrupted source of electrical potential that can provide the desired rotor position information. Combining this PMG information with modifications to existing power electronic technology produces a very simple and robust motor drive architecture that makes a WFSDM more suitable as a starter-generator for aeronautical applications.

Generally, the invention comprises a motor control system for a polyphase wound rotor WFSDM used as a motor and a generator, wherein the WFSDM has an integral PMG for use in a generating mode, comprising: a scaling amplifier for receiving a signal derived from a polyphase output signal generated by the PMG and amplifying it by an amplification factor K to generate a scaling amplifier output signal that approximates back electromotive force (EMF) potentials developed by main stator windings in the WFSDM; a Clarke transformation that receives the scaling amplifier output signal and converts it to a Clarke transformation output signal that comprises two orthogonal electrical potentials $V_x$ and $V_y$ representing direct and quadrature axis electrical potentials for a main rotor in the WFSDM; a real power P and imaginary power Q (PQ) motor current controller that receives the Clarke transformation signal and generates a PQ motor current controller output signal that comprises two orthogonal electrical currents $I_x$ and $I_y$ representing direct and quadrature axis electrical currents that should drive the main rotor of the WFSDM at desired rotational speeds of the WFSDM with measured levels of input electrical potentials and currents; an inverse Clarke transformation that receives the PQ motor current controller output signal and converts it to an inverse Clarke transformation output signal representing reference levels of drive current for each respective phase of the WFSDM; a comparator for comparing the inverse Clarke transformation signal to actual values of current that the WFSDM receives for each of its respective phases to generate a comparator output signal representative of any difference; a modulator for receiving the comparator output signal and generating an appropriate modulation signal; a gate drive controller for receiving the modulation signal and generating a respective gate drive signal; and an inverter for receiving the gate drive signal and generating motor drive output signals for each respective phase of the WFSDM that are suitable for driving the WFSDM with the desired rotational speed and torque.

DETAILED DESCRIPTION OF THE INVENTION

Figure 1:
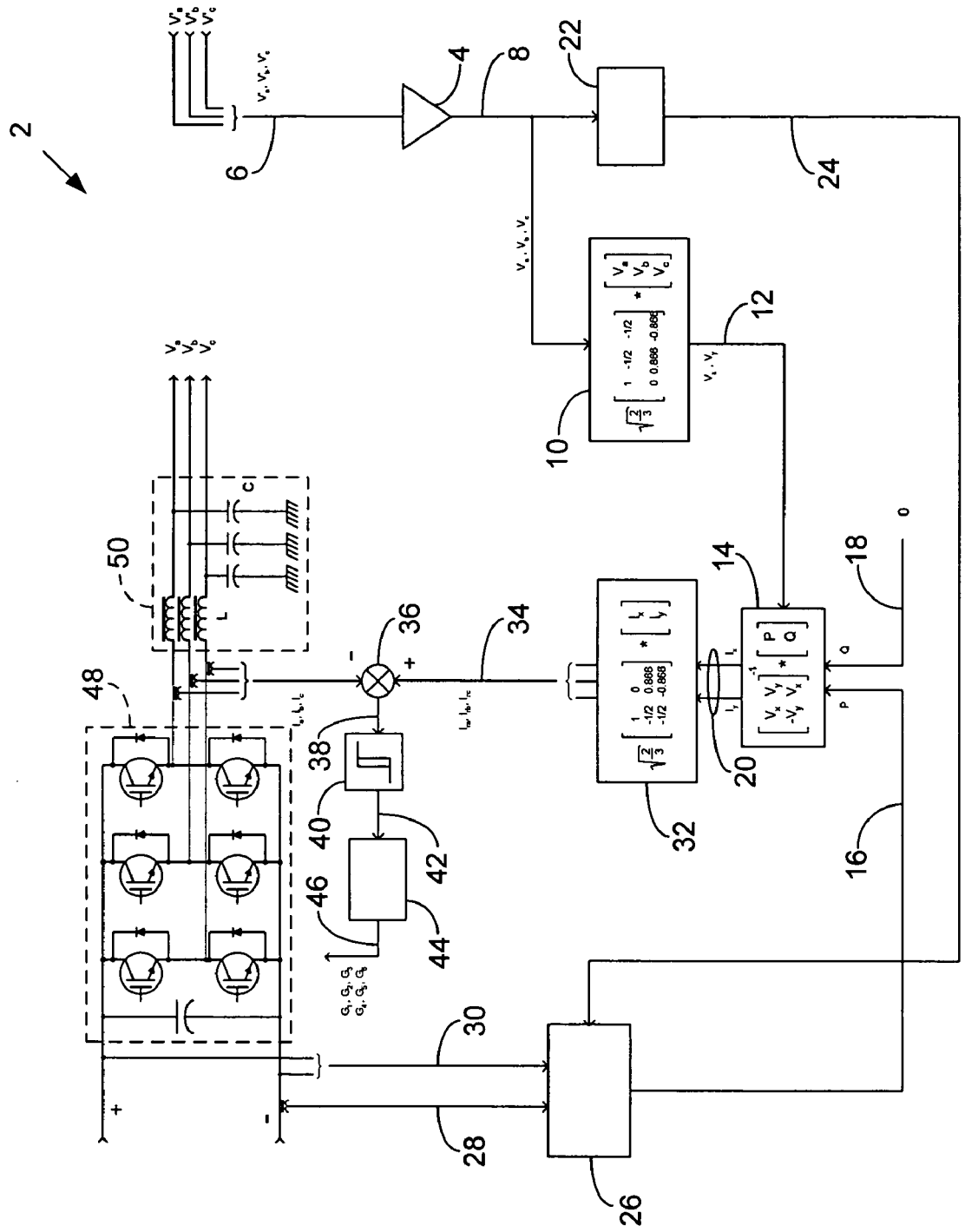
FIG. 1 is a top-level schematic diagram of a motor control system according to a first possible embodiment of the invention.

As well known in the art, a two-phase orthogonal system can define a three-phase system. The resulting two phases may represent direct and quadrature axes to define electrical potential components and/or current components as they relate to alignment with various selected parameters. Examples include direct and quadrature axes relative to a rotor of a synchronous motor or real and reactive currents relative to supply voltage in a power system.

As a specific example consider a three-phase system, with phases a, b and c that have respective electrical potentials $V_a$, $V_b$ and $V_c$ and currents $I_a$, $I_b$ and $I_c$. Transforming these parameters into a two-axis system gives:

$$\begin{bmatrix} V_x \\ V_y \end{bmatrix} = \sqrt{\frac{2}{3}} \begin{bmatrix} 1 & -1/2 & -1/2 \\ 0 & 0.866 & -0.866 \end{bmatrix} * \begin{bmatrix} V_a \\ V_b \\ V_c \end{bmatrix} \quad (1)$$

$$\begin{bmatrix} I_x \\ I_y \end{bmatrix} = \sqrt{\frac{2}{3}} \begin{bmatrix} 1 & -1/2 & -1/2 \\ 0 & 0.866 & -0.866 \end{bmatrix} * \begin{bmatrix} I_a \\ I_b \\ I_c \end{bmatrix} \quad (2)$$

wherein $V_x$ and $I_x$ are the respective electrical potential and current for a direct axis x and $V_y$ and $I_y$ are the respective electrical potential and current for a quadrature axis y.

The power flow for this system can be determined by:

$$\begin{bmatrix} P \\ Q \end{bmatrix} = \begin{bmatrix} V_x & V_y \\ -V_y & V_x \end{bmatrix} * \begin{bmatrix} I_x \\ I_y \end{bmatrix} \quad (3)$$

wherein P is the instantaneous real power and Q is the instantaneous imaginary power.

These equations are applicable to a motor drive application for a dynamoelectric machine by assigning the potentials $V_a$, $V_b$, and $V_c$ to the back electromotive force (EMF) potentials and the currents $I_a$, $I_b$ and $I_c$ to the currents for each phase of the machine. The power flow is that which flows into the machine's rotor. The impedance associated with the machine's stator windings makes the back EMF difficult to measure directly. This is the problem associated with all motor drive control systems. Faithfully reproducing or estimating this internal back EMF potential is a difficult task.

For a dynamoelectric machine used in an aircraft starter/generator application, the machine is a WFSDM that typically has full excitation during the starting mode. Full excitation generates maximum torque per ampere of main stator current, thereby providing the most efficient starting operation. Because the WFSDM has full excitation during the starting mode, its characteristics are very similar to that of a PMG. Specifically, the variation of the amplitude and the variation of the frequency of the internal back EMF that the fully excited WFSDM generates as it relates to shaft position and speed are essentially identical to that of a PMG. Because a PMG customarily mounts on the same shaft as the WFSDM's rotor, it may provide the back EMF information we need for the WFSDM when it is in the starting mode. Although the absolute amplitude of the PMG electrical potential may be different from that of the WFSDM, it will remain proportional to the back EMF of the WFSDM over the entire rotational speed range of interest. With appropriate scaling, the output potential of the PMG may faithfully represent the elusive back EMF potential of the WFSDM needed for real power P and imaginary power Q (PQ) motor control. For the proposed method of PQ motor control, it is essential that the PMG have the same number of poles as the WFSDM. Relative orientation between the WFSDM and PMG is less important because electronic motor drive controls may accommodate any offset angle between them. Knowing the desired mechanical power that the fully excited WFSDM needs for the starting mode and the back EMF for the WFSDM under such conditions, manipulation of the hereinbefore-described equations may express the instantaneous currents needed to drive the motor. The expression for these currents is:

$$\begin{bmatrix} I_{ra} \\ I_{rb} \\ I_{rc} \end{bmatrix} = \sqrt{\frac{2}{3}} \begin{bmatrix} 1 & 0 \\ -1/2 & 0.866 \\ -1/2 & -0.866 \end{bmatrix} * \begin{bmatrix} V_x & V_y \\ -V_y & V_x \end{bmatrix}^{-1} * \begin{bmatrix} P \\ Q \end{bmatrix} \quad (4)$$

wherein $I_{ra}$, $I_{rb}$, and $I_{rc}$ are the desired currents that apply to each respective phase of the WFSDM to produce the desired mechanical power. These currents are reference currents and are instantaneous input quantities for power circuit modulators in a motor drive that controls the WFSDM during the starting mode. Expression (1) provides the electrical potentials $V_x$ and $V_y$. The output potentials of the PMG with appropriate scaling provide the electrical potentials $V_a$, $V_b$, and $V_c$ needed to solve expression (1).

FIG. 1 is a top-level schematic diagram of a motor control system 2 according to a first possible embodiment of the invention that uses the hereinbefore-described methodology. A scaling amplifier 4 receives a polyphase output signal on a PMG output line 6 from a PMG integrated into a WFSDM (not shown) for a starter/generator application. For a three-phase PMG, the PMG output signal comprises electrical potentials $V'_a$, $V'_b$ and $V'_c$ for each respective phase. The scaling amplifier modifies the PMG output signal by an amplification factor K to produce a scaling amplifier output signal on a scaling amplifier output line 8 that comprises an approximation of the back EMF electrical potentials for each respective phase of the WFSDM. For a three-phase WFSDM, these electrical potentials comprise $V_a$, $V_b$ and $V_c$.

A Clarke transformation 10 receives the PMG output signal on the scaling amplifier output line 8 to produce a Clarke transformation output signal on a Clarke transformation output line 12 that comprises the direct axis electrical potential $V_x$ and the quadrature electrical potential $V_y$ as shown in equation (1). A PQ motor current controller 14 receives the Clarke transformation output signal on the Clarke transformation output line 12. It also receives a power demand signal P on a power demand input line 16 and an imaginary power demand signal Q on an imaginary power demand input line 18 to produce a PQ motor current controller output signal on a PQ motor current controller output signal line 20. The PQ motor current controller output signal comprises the direct axis current $I_x$ and the quadrature axis current $I_y$. The PQ motor current controller 14 processes the direct axis electrical potential $V_x$, the quadrature axis electrical potential $V_y$, the power demand signal P and the imaginary power demand signal Q to generate values for $I_x$ and $I_y$ according to the relationship:

$$\begin{bmatrix} I_x \\ I_y \end{bmatrix} = \begin{bmatrix} V_x & V_y \\ -V_y & V_x \end{bmatrix}^{-1} * \begin{bmatrix} P \\ Q \end{bmatrix} \quad (5)$$

A frequency counter 22 measures the frequency of the PMG output signal on the scaling amplifier output line 8 to produce a motor rotational speed signal on a frequency counter output signal line 24 that is representative of the rotational speed of the WFSDM. A power demand look up table (LUT) 26 receives the motor rotational speed signal on the frequency counter output signal line 24. The power demand LUT 26 also receives a power supply current signal $I_{link}$ representative of power supplied to the WFSDM on a power supply current signal link 28 and a power supply electrical potential signal $V_{link}$ on a power supply electrical potential signal link 30. Based on the values of the power supply current signal link, the power supply electrical potential signal $V_{link}$ and the motor rotational speed signal, the power demand LUT 26 generates an appropriate value of the power demand signal P on the power demand input line 16. The level of the imaginary power demand signal level Q on the imaginary power demand signal line 18 generally remains at zero.

An inverse Clarke transformation 32 receives the PQ motor current controller output signal on the PQ motor current controller output signal line 20 that comprises the direct axis current $I_x$ and the quadrature axis current $I_y$ and converts it to an inverse Clarke transformation signal on an inverse Clarke transformation signal output line 34 that comprise the desired currents $I_{ra}$, $I_{rb}$, and $I_{rc}$ for each respective phase of the WFSDM to produce the desired mechanical power as hereinbefore expressed in equation (4).

A comparator 36 receives the inverse Clarke transformation signal that comprises $I_{ra}$, $I_{rb}$, and $I_{rc}$ on the inverse Clarke transformation signal output line 34 and compares them to the actual values of current $I_a$, $I_b$ and $I_c$ that the WFSDM receives for each of its respective phases to produce a comparator error signal on a comparator output line 38. A modulator 40 receives the comparator error signal on the comparator output line 38 and generates an appropriate modulation signal on a modulator output signal line 42. Although FIG. 1 indicates a modulator 40 that employs a current hysteresis modulation technique, other modulation techniques are also appropriate, as those skilled in the art shall appreciate.

A gate drive controller 44 receives the modulation signal on the modulator output signal line 42 to generate a gate drive signal on a gate drive controller output line 46 that is suitable to drive an inverter 48. The inverter 48 receives the gate drive signal on the gate drive controller output line 46 to produce motor drive output signals $V_a$, $V_b$ and $V_c$ for each respective phase of the WFSDM that are suitable for driving the WFSDM with the desired rotational speed and torque. An electromagnetic interference (EMI) filter 50 may optionally provide improved operation of the motor control system 2.

The PMG provides no voltage at zero rotational speed. However, above a definable minimum speed, the PMG provides electrical potentials of sufficient amplitude to assure proper operation of the motor control system 2. For operation between zero and this minimum speed, it is common practice to slowly accelerate the WFSDM with the motor control system 2 in an without position sense information open loop manner by using a pre-programmed current reference rotationally accelerated until sufficient rotational speed is reached for closed loop operation. Once the motor control system 2 achieves closed loop operation, the motor control system 2 can accelerate much faster with maximum available torque. Whilst this technique may not be useful for many motor drive applications, it is acceptable for engine starting operations where sustained low speed operation, manoeuvring or positioning is not required.

However, it is desirable to have a control system for starter applications wherein the open loop acceleration is restricted to the lowest practical speeds. That is, the closed loop operation should work at as low of a speed as is practical. In this manner, the open loop acceleration maintains a very low level to assure the load accelerates without slipping poles and losing control. In effect, with the use of extremely low accelerations, the inertial torque required by the motor control system 2 becomes negligible, thereby allowing virtually all of the available torque to overcome friction, stiction, and so forth. An open loop acceleration that is less than the closed loop acceleration by a factor of ten or more effectively accomplishes this.

In a typical engine start scenario, the WFSDM must accelerate the engine to starter cutout speed or idle speed in approximately 60 seconds. Idle speed may herein represent 100 percent or maximum rotational speed. An appropriate time to allow for substantially reduced acceleration during open loop operation at the beginning of the start cycle might be approximately five percent of that time, or approximately three seconds. Using the fact that the engine reaches 100 percent speed in approximately 60 seconds, the average acceleration through the full start cycle it is evident that the resulting "normal" acceleration is approximately 1.67 percent speed per second. Choosing a very low acceleration for open loop operation of approximately one tenth of normal results in an acceleration of 0.167 percent per second. In order to satisfy the requirement of no more than three seconds at low acceleration, the speed at which closed loop operation should occur is therefore no more than 0.167×3=0.5 percent of idle speed. Because a typical WFSDM operates at approximately 400 Hz at engine idle speed, closed loop operation should occur at a frequency of no more than 0.5 percent of 400 Hz, approximately 2 Hz. Finally, because the PMG that mounts in a WFSDM for aeronautical applications typically provides about 20 V rms at engine idle, the electrical potential available from the PMG at the transition speed to closed loop operation is 0.5% of 20 V rms, approximately 0.1 V rms. Whilst this is a discernable potential, it is small enough that the signal-to-noise ratio can be challenging, especially when the physical distance between the motor controller system 2 and the WFSDM is large. Providing good closed loop operation at this low potential whilst accommodating 20 V rms near the end of the start cycle represents a 200:1 voltage ratio and poses challenging design criteria. Although possible, it would be better for the motor control system 2 to receive a much smaller range or swing of electrical potential.

Figure 2:
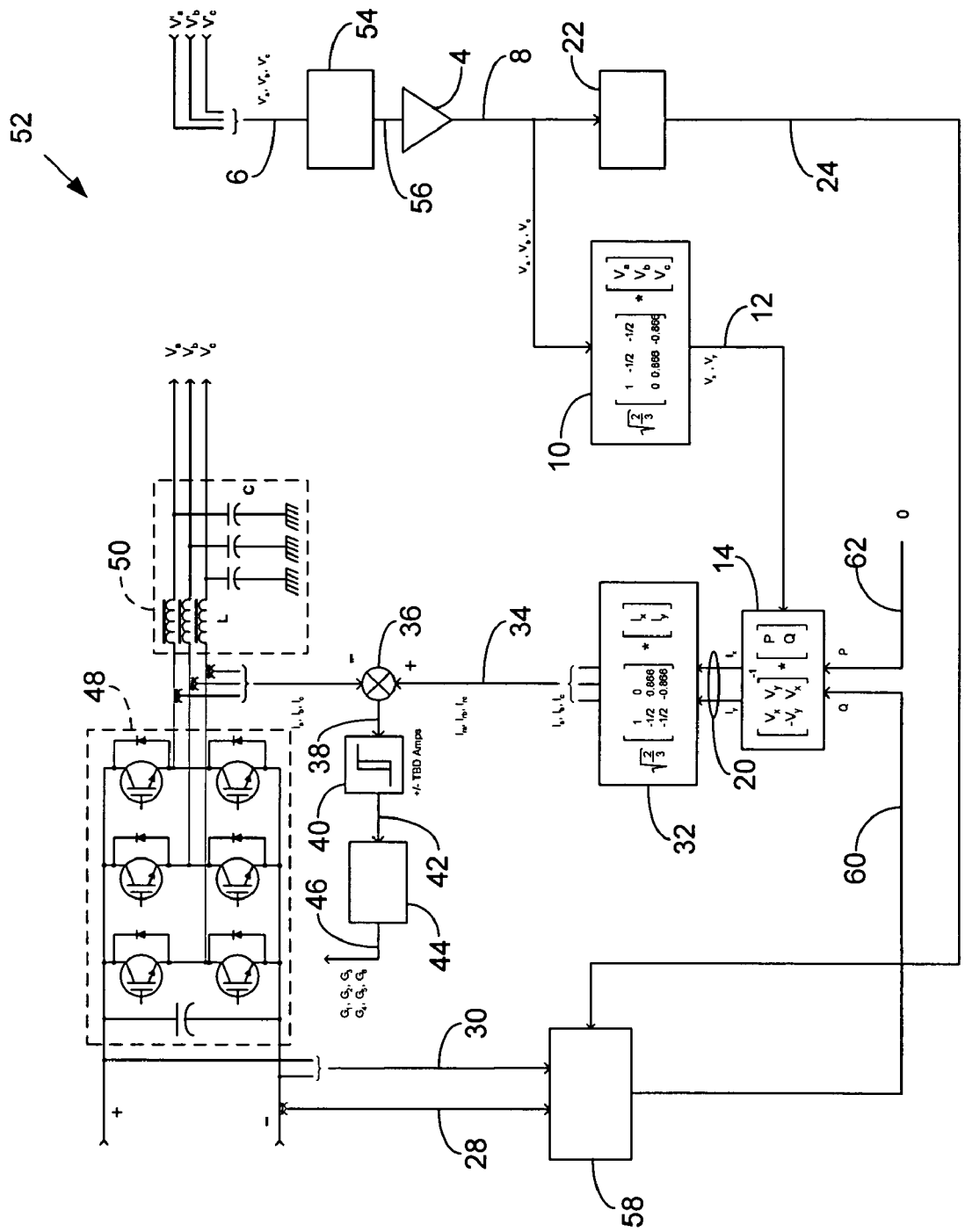
FIG. 2 is a top-level schematic diagram of a motor control system according to a second possible embodiment of the invention.

FIG. 2 is a top-level schematic diagram of a motor control system 52 according to a second possible embodiment of the invention that may alleviate the range or swing of electrical potential problem associated with using the PMG potential directly. This embodiment still does not permit closed loop operation at zero speed, but it does offer a substantial improvement over using the output signal of the PMG directly as hereinbefore described in the first embodiment in connection with FIG. 1. In this embodiment, an integrator 54 receives the PMG output signal on the PMG output signal line 6. The integrator 54 integrates the PMG output signal to generate an integrator output signal on an integrator output signal line 56. The scaling amplifier 4 then receives the integrator output signal on the integrated output signal line 56.

Several advantages then accrue as a result of integrating the PMG output signal. One advantage is that above the minimum closed loop operational speed, the amplitude of the integrator output signal from the integrator 54 is constant and independent of speed and can de designed to be any appropriate level. This is due to the fact that although the integrator output decreases inversely as PMG frequency increases, the PMG output signal magnitude increases proportionally with speed. The net result is a constant integrator output. Thus, the signal-to-noise and electrical potential range or swing issues are virtually eliminated. Another advantage is that because the amplitude of the integrator output signal is constant, the PQ equations hereinbefore described become torque and imaginary, or TQ, equations.

That is to say, the hereinbefore-described PQ equations originally derived the real power term (P) from the product of instantaneous electrical potential and current wherein the electrical potential represented the machine's fully excited internal electrical potential and the current represented the applied currents. As the machine's electrical potential changes in proportion with rotational speed, the power also changes proportionally for fixed current amplitude. With the integrator 54, the electrical potential provided to the motor control system 52 is constant and independent of speed, so for a constant applied current, the calculated value of P shall also be constant for all speeds. Therefore, the previously defined PQ terms no longer represent power quantities at all. In fact, the derived PQ terms shall then represent torque. Another consideration is that because the integrator 54 introduces a 90-degree phase shift at all speeds above the minimum closed loop operational speed, the P term becomes representative of the imaginary torque and the Q term is representative of the real torque. FIG. 2 reflects this difference, wherein these variables have interchanged positions relative to the first embodiment hereinbefore described in connection with FIG. 1. Consequently, a torque demand LUT 58 that generates a torque demand signal Q on a torque demand signal line 60 replaces the power demand LUT 26 in the first embodiment hereinbefore described in connection with FIG. 1 and the PQ motor current controller 14 receives this torque demand signal Q on the torque demand signal line 60. Likewise, the PQ motor current controller 14 receives an imaginary torque demand signal on an imaginary torque demand signal line 62. The level P on the imaginary torque demand signal line 62 generally remains at zero.

The integrator 54 preferably has a lower "corner frequency" such that between zero frequency and the corner frequency the integrator 54 is a constant gain amplifier. In this manner the integrator 54 shall retain good direct current (DC) error characteristics that minimises DC drift, an essential requirement for practical implementation of an integrator. For instance, the corner frequency may be 1 Hz, so that above 1 Hz the integrator 54 is at provides full electrical potential over the desired frequency range. The integrator 54 may provide an integrator output signal on the integrator output signal line 56 that provides a suitable level, such as 5 volts rms, which is an ideal potential for control circuitry of this nature and much better than the 0.1 to 20 volt range that may be encountered by the first embodiment hereinbefore described in connection with FIG. 1.

The advantage of the hereinbefore-described embodiments is essentially the elimination of the dedicated resolver normally needed for synchronous motor drives for aircraft starter/generator systems. Although a PMG provides this function, it is always available in the aircraft electrical power generator for other system design reasons. There is no need for additional components or wiring beyond that normally provided for the PMG. Furthermore, the hereinbefore-described embodiments do not require complex circuits and functions to "decode" the PMG output signal into a resolver type function. Instead, the hereinbefore-described embodiments apply the PMG output signal either directly or through a simple integrator into more-or-less conventional motor drive circuits, thereby offering an excellent combination of simplicity, robustness and economy.

The described embodiments of the invention are only some illustrative implementations of the invention wherein changes and substitutions of the various parts and arrangement thereof are within the scope of the invention as set forth in the attached claims.

The claimed invention is:

1. A motor control system for a polyphase wound field synchronous dynamoelectric machine (WFSDM) used as a motor and a generator, wherein the WFSDM has an integral polyphase permanent magnet generator (PMG) for use in a generating mode, comprising:
   a scaling amplifier for receiving a signal derived from a polyphase output signal produced by the PMG and amplifying it by an amplification factor K to generate a scaling amplifier output signal that approximates back electromotive force (EMF) potentials developed by main stator windings in the WFSDM;
   a Clarke transformation that receives the scaling amplifier output signal and converts it to a Clarke transformation output signal that comprises two orthogonal electrical potentials $V_x$ and $V_y$ representing direct and quadrature axis electrical potentials for a main rotor in the WFSDM;
   a real power P and imaginary power Q (PQ) motor current controller that receives the Clarke transformation signal and generates a PQ motor current controller output signal that comprises two orthogonal electrical currents $I_x$ and $I_y$ representing direct and quadrature axis electrical currents that should drive the main rotor of the WFSDM at desired rotational speeds of the WFSDM with measured levels of input electrical potentials and currents;
   an inverse Clarke transformation that receives the PQ motor current controller output signal and converts it to an inverse Clarke transformation output signal representing reference levels of drive current for each respective phase of the WFSDM;
   a comparator for comparing the inverse Clarke transformation signal to actual values of current that the WFSDM receives for each of its respective phases to generate a comparator output signal representative of any difference;
   a modulator for receiving the comparator output signal and generating an appropriate modulation signal;
   a gate drive controller for receiving the modulation signal and generating a respective gate drive signal; and
   an inverter for receiving the gate drive signal and generating motor drive output signals for each respective phase of the WFSDM that are suitable for driving the WFSDM with the desired rotational speed and torque.

2. The motor control system of claim 1, wherein the WFSDM and the PMG are three-phase.

3. The motor control system of claim 1, wherein the WFSDM and the PMG have the same number of poles.

4. The motor control system of claim 1, wherein the modulator is of the hysteresis type.

5. The motor control system of claim 1, wherein the motor control system accelerates the WFSDM up to a maximum rotational speed at a normal acceleration rate up to the maximum speed, and the system starts in open loop operation at no more than approximately one tenth normal acceleration and switches to closed loop operation at no more than approximately 0.5 percent of the maximum rotational speed.

6. The motor control system of claim 1, further comprising:
   a frequency counter that receives the scaling amplifier output signal and generates a frequency counter output signal that represents the rotational frequency of the WFSDM;
   a power demand look up table (LUT) that receives the frequency counter output signal, an input power current signal $I_{link}$, and an input power electrical potential signal $V_{link}$ to generate a real power demand signal P representative of the input power and rotational speed of the WFSDM;

wherein the PQ motor current controller receives the real power demand signal P and an imaginary power demand signal Q along with the Clarke transformation signal to generate the PQ motor current controller output signal.

7. The motor control system of claim 1, further comprising:

an integrator for receiving the polyphase output signal generated by the PMG and generating an integrator output signal;

a frequency counter that receives the scaling amplifier output signal and generates a frequency counter output signal that represents the rotational frequency of the WFSDM;

a torque demand look up table (LUT) that receives the frequency counter output signal, an input power current signal $I_{link}$, and an input power electrical potential signal $V_{link}$ to generate a real torque demand signal Q representative of the input power and rotational speed of the WFSDM;

wherein the scaling amplifier receives the integrator output signal and the PQ motor current controller receives the real torque demand signal Q and an imaginary torque demand signal P along with the Clarke transformation signal to generate the PQ motor current controller output signal.

8. A motor control system for a three phase wound field synchronous dynamoelectric machine (WFSDM) used as a motor and a generator, wherein the WFSDM has an integral three-phase permanent magnet generator (PMG) for use in a generating mode, comprising:

a scaling amplifier for receiving a signal derived from a three-phase output signal produced by the PMG and amplifying it by an amplification factor K to generate a scaling amplifier output signal that approximates back electromotive force (EMF) potentials developed by main stator windings in the WFSDM;

a Clarke transformation that receives the scaling amplifier output signal and converts it to a Clarke transformation output signal that comprises two orthogonal electrical potentials $V_x$ and $V_y$ representing direct and quadrature axis electrical potentials for a main rotor in the WFSDM;

a real power P and imaginary power Q (PQ) motor current controller that receives the Clarke transformation signal and generates a PQ motor current controller output signal that comprises two orthogonal electrical currents $I_x$ and $I_y$ representing direct and quadrature axis electrical currents that should drive the main rotor of the WFSDM at desired rotational speeds of the WFSDM with measured levels of input electrical potentials and currents;

an inverse Clarke transformation that receives the PQ motor current controller output signal and converts it to an inverse Clarke transformation output signal representing reference levels of drive current for each respective phase of the WFSDM;

a comparator for comparing the inverse Clarke transformation signal to actual values of current that the WFSDM receives for each of its respective phases to generate a comparator output signal representative of any difference;

a modulator for receiving the comparator output signal and generating an appropriate modulation signal;

a gate drive controller for receiving the modulation signal and generating a respective gate drive signal;

an inverter for receiving the gate drive signal and generating motor drive output signals for each respective phase of the WFSDM that are suitable for driving the WFSDM with the desired rotational speed and torque;

a frequency counter that receives the scaling amplifier output signal and generates a frequency counter output signal that represents the rotational frequency of the WFSDM; and a power demand look up table (LUT) that receives the frequency counter output signal, an input power current signal $I_{link}$, and an input power electrical potential signal $V_{link}$ to generate a real power demand signal P representative of the input power and rotational speed of the WFSDM;

wherein the PQ motor current controller receives the real power demand signal P and an imaginary power demand signal Q along with the Clarke transformation signal to generate the PQ motor current controller output signal.

9. The motor control system of claim 8, wherein the WFSDM and the PMG have the same number of poles.

10. The motor control system of claim 8, wherein the modulator is of the hysteresis type.

11. The motor control system of claim 8, wherein the motor control system accelerates the WFSDM up to a maximum rotational speed at a normal acceleration rate up to the maximum speed, and the system starts in open loop operation at no more than approximately one tenth normal acceleration and switches to closed loop operation at no more than approximately five percent of the maximum rotational speed.

12. A motor control system for a three-phase wound field synchronous dynamoelectric machine (WFSDM) used as a motor and a generator, wherein the WFSDM has an integral three-phase permanent magnet generator (PMG) for use in a generating mode, comprising:

a scaling amplifier for receiving a signal derived from a three-phase output signal produced by the PMG and amplifying it by an amplification factor K to generate a scaling amplifier output signal that approximates back electromotive force (EMF) potentials developed by main stator windings in the WFSDM;

a Clarke transformation that receives the scaling amplifier output signal and converts it to a Clarke transformation output signal that comprises two orthogonal electrical potentials $V_x$ and $V_y$ representing direct and quadrature axis electrical potentials for a main rotor in the WFSDM;

a real power P and imaginary power Q (PQ) motor current controller that receives the Clarke transformation signal and generates a PQ motor current controller output signal that comprises two orthogonal electrical currents $I_x$ and $I_y$ representing direct and quadrature axis electrical currents that should drive the main rotor of the WFSDM at desired rotational speeds of the WFSDM with measured levels of input electrical potentials and currents;

an inverse Clarke transformation that receives the PQ motor current controller output signal and converts it to an inverse Clarke transformation output signal representing reference levels of drive current for each respective phase of the WFSDM;

a comparator for comparing the inverse Clarke transformation signal to actual values of current that the WFSDM receives for each of its respective phases to generate a comparator output signal representative of any difference;

a modulator for receiving the comparator output signal and generating an appropriate modulation signal;

a gate drive controller for receiving the modulation signal and generating a respective gate drive signal;

an inverter for receiving the gate drive signal and generating motor drive output signals for each respective phase of the WFSDM that are suitable for driving the WFSDM with the desired rotational speed and torque;

an integrator for receiving the polyphase output signal generated by the PMG and generating an integrator output signal;

a frequency counter that receives the scaling amplifier output signal and generates a frequency counter output signal that represents the rotational frequency of the WFSDM; and a torque demand look up table (LUT) that receives the frequency counter output signal, an input power current signal $I_{link}$, and an input power electrical potential signal $V_{link}$ to generate a real torque demand signal Q representative of the input power and rotational speed of the WFSDM;

wherein the scaling amplifier receives the integrator output signal and the PQ motor current controller receives the real torque demand signal Q and an imaginary torque demand signal P along with the Clarke transformation signal to generate the PQ motor current controller output signal.

13. The motor control system of claim 12, wherein the WFSDM and the PMG have the same number of poles.

14. The motor control system of claim 12, wherein the modulator is of the hysteresis type.

15. The motor control system of claim 12, wherein the motor control system accelerates the WFSDM up to a maximum rotational speed at a normal acceleration rate up to the maximum speed, and the system starts in open loop operation at no more than approximately one tenth normal acceleration and switches to closed loop operation at no more than approximately 0.5 percent of the maximum rotational speed.

16. The motor control system of claim 15, wherein the integrator has a lower corner frequency selected to minimise direct current (DC) drift and permit the integrator output signal to attain full electrical potential over a desired frequency range.

* * * * *